United States Patent
Shibata et al.

(10) Patent No.: US 7,204,683 B2
(45) Date of Patent: *Apr. 17, 2007

(54) MOLDING DIE FOR COVERING OPTICAL FIBER AND OPTICAL FIBER COVER FORMING DEVICE

(75) Inventors: Toshio Shibata, Tokyo (JP); Tomohiro Akiyama, Tokyo (JP); Hideki Watanabe, Tokyo (JP); Hidekazu Kojima, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 351 days.

This patent is subject to a terminal disclaimer.

(21) Appl. No.: 10/468,674

(22) PCT Filed: Jun. 20, 2002

(86) PCT No.: PCT/JP02/06153

§ 371 (c)(1),
(2), (4) Date: Mar. 15, 2004

(87) PCT Pub. No.: WO03/001259

PCT Pub. Date: Jan. 3, 2003

(65) Prior Publication Data
US 2004/0146596 A1    Jul. 29, 2004

(30) Foreign Application Priority Data
Jun. 22, 2001 (JP) ............... 2001-189554
Oct. 24, 2001 (JP) ............... 2001-326644

(51) Int. Cl.
*B29C 45/14* (2006.01)
*B29C 70/74* (2006.01)
(52) U.S. Cl. ............... 425/116; 425/192.1; 425/173; 425/174.4
(58) Field of Classification Search ............... 425/116, 425/129.1, 173, 174.4; 264/263
See application file for complete search history.

(56) References Cited

U.S. PATENT DOCUMENTS 4,976,596 A * 12/1990 Darsey et al. ............... 425/117

(Continued)

FOREIGN PATENT DOCUMENTS

JP    6-148452    5/1994

(Continued)

OTHER PUBLICATIONS

Partial machine translation of JP 08-54530A obtained from the JPO website.*

(Continued)

*Primary Examiner*—Robert B. Davis
(74) *Attorney, Agent, or Firm*—Oblon, Spivak, McClelland, Maier & Neustadt, P.C.

(57) ABSTRACT

A mold is provided in which a molding portion, formed between joint surfaces of upper and lower molds superimposed one upon the other, is filled with UV curable resin after arranging a coating formation portion of an optical fiber in the molding portion, the coating formation portion is coated with the UV curable resin when the resin is cured by irradiating light thereto from outside, and a shading plate is arranged in the periphery of the molding portion. In a case equipped with the mold, there is provided a mirror or a lens for reflecting UV light to UV curable resin.

8 Claims, 13 Drawing Sheets

U.S. PATENT DOCUMENTS

| | | | |
|---|---|---|---|
| 4,988,274 A * | 1/1991 | Kenmochi | 425/174.4 |
| 5,288,221 A * | 2/1994 | Stoerr et al. | 425/125 |
| 6,688,870 B2 * | 2/2004 | Shibata et al. | 425/117 |
| 6,863,514 B2 * | 3/2005 | Suzuki et al. | 425/116 |
| 6,863,515 B2 * | 3/2005 | Nakamichi et al. | 425/116 |
| 2002/0033546 A1 * | 3/2002 | Kojima et al. | 264/1.27 |

FOREIGN PATENT DOCUMENTS

| | | |
|---|---|---|
| JP | 7-261049 | 10/1995 |
| JP | 7-311316 | 11/1995 |
| JP | 6-54530 | 2/1996 |

OTHER PUBLICATIONS

International Search Report dated Sep. 3, 2002 for International Application No. PCT/JP02/06153, filed Jun. 20, 2002.

* cited by examiner

FIG. 1
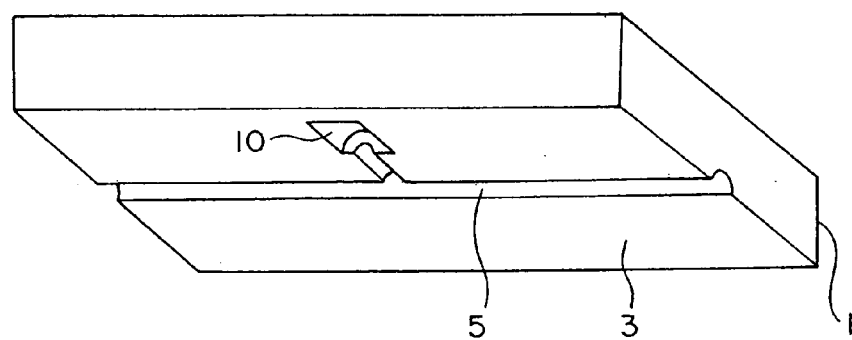
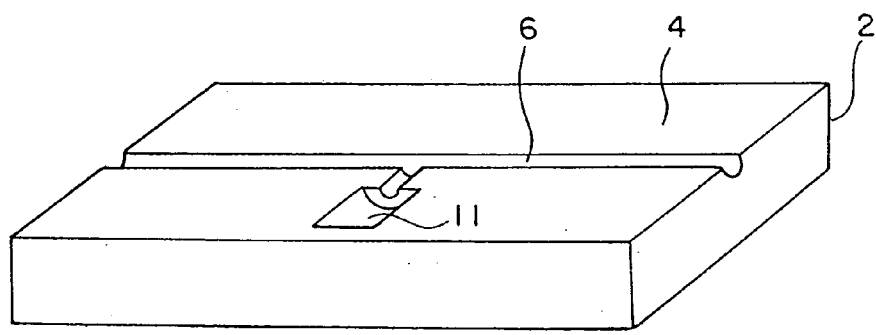

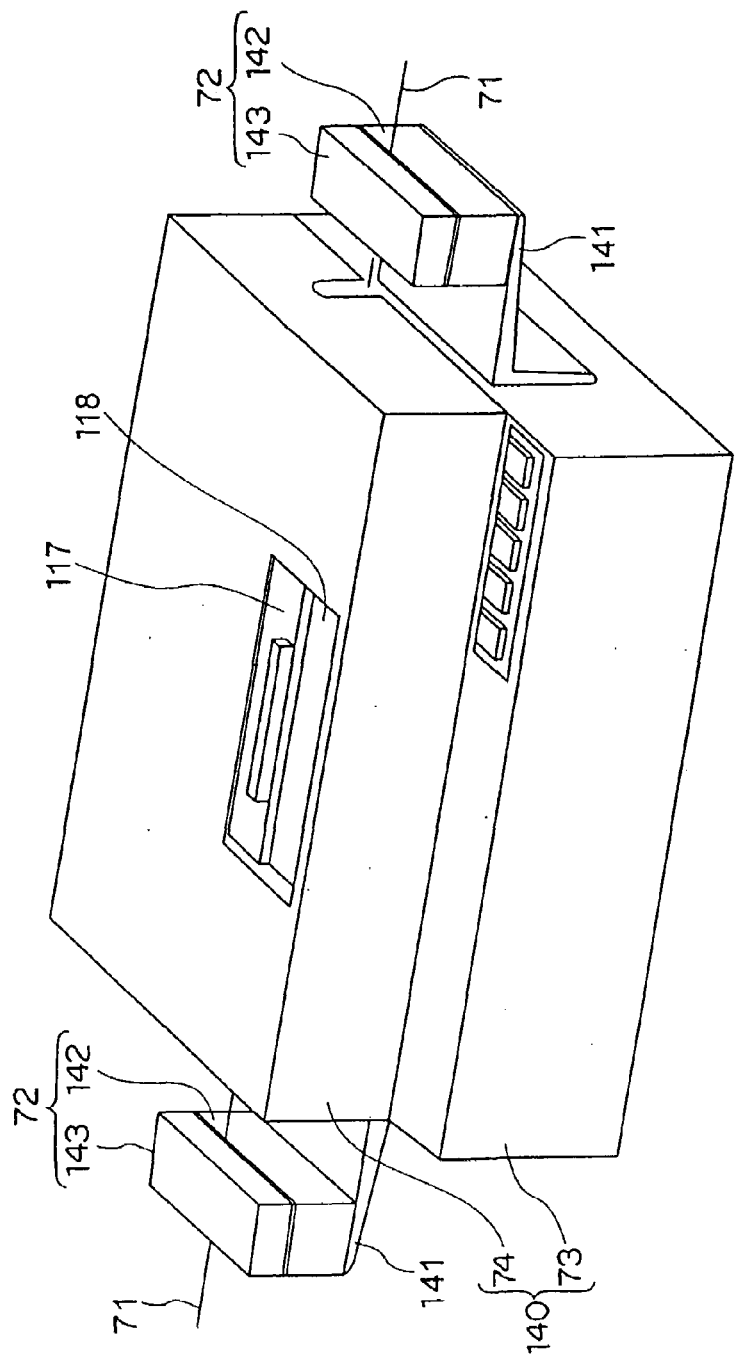

MOLDING DIE FOR COVERING OPTICAL FIBER AND OPTICAL FIBER COVER FORMING DEVICE

TECHNICAL FIELD

The present invention relates to an optical fiber coating mold and an optical fiber coating forming device to be used to re-coat a portion of an optical fiber from which coating has been removed and to newly coat the outer periphery of an optical fiber core.

BACKGROUND OF THE RELATED ART

When performing branching, distribution, etc. on optical fibers, the end portion of each optical fiber is exposed by removing the coating by a predetermined length; after fusion—splice the end portions to each other, the coating peeled-off portion (the portion requiring coating forming: coating formation portion) is protected by reinforcing through re-coating with UV curable resin. In some cases, the outer periphery of the optical fiber core is newly coated.

For re-coating, a coating forming device equipped with a mold is used. The mold is composed of a lower mold and an upper mold mounted thereto so as to be capable of being opened and closed. In the opposing surfaces (joint surfaces) of the lower and upper molds, there are formed semi-cylindrical re-coating grooves (molding grooves); when the upper mold is closed to be superimposed on the lower mold, their re-coating grooves are opposed to each other to define a cylindrical molding portion. The coating formation portion of an optical fiber is placed in this molding portion and then ultraviolet (UV) curable resin is supplied to the interior of the molding portion; when UV light is irradiated to the UV curable resin from outside the mold, the UV curable resin cures to re-coat the outer periphery of the coating formation portion.

From the viewpoint of convenience in accommodation, handling, etc., it is desirable that the coated portion be as small as possible. In view of this, nowadays, only the coating formation portion is re-coated with UV curable resin. Further, regarding re-coating, there are the following requirements:

1. With the development of Wavelength Division Mutiplexing (WDM) communication technology etc., there is a demand for production of optical fiber amplifiers and optical parts in a large amount, so that it is necessary to reduce the requisite processing time for the operations, such as optical fiber cutting, peeling-off of coating, connection of optical fibers, and coating of coating formation portions.

2. Since more and more coating forming devices have come to be used where optical parts are produced, there is a demand for a reduction in size, weight, and power consumption for convenience in handling. For a reduction in size and weight, the UV light utilization efficiency should be enhanced.

The above coating forming device makes it possible to coat the coating formation portion of an optical fiber with resin. However, it involves the following problems:

(1) The UV light irradiated to the mold is irradiated not only to the molding portion but also to its periphery. More specifically, the UV light is also irradiated to the joint surfaces between the lower and upper molds, the supply passage for supplying UV curable resin to the molding portion, the supply port connecting the supply passage and the molding portion, etc. Thus, when the UV curable resin supplied into the molding portion is allowed to protrude over the joint surfaces, the resin will cure between the joint surfaces, resulting in difficulty in opening the upper mold or generation of burr in the coated portion. Further, when some UV curable resin remains in the supply passage and the supply port, the resin will cure to clog the supply passage and the supply port.

(2) In actual coating operation, there may be a case where sufficient quantity of UV light does not reach the back side of the coating formation portion of the optical fiber placed in the mold. In such a case, the UV light irradiation time is increased or UV curable resin with thermosetting property is used, heating the resin with a heater while irradiating UV light thereto. However, increasing the UV light irradiation time makes it impossible to achieve a reduction in the time consumed for the coating operation. Consequently, it involves larger power consumption of the heater, according to the irradiation time increase, resulting in high cost. Further, it causes difficulty in reducing the size of the UV lamp turning-on system, in particular, the high voltage power source.

(3) To enhance the UV light utilization efficiency, a coating forming device has been developed in which a reflection plate equipped with a concave reflection surface is arranged above the upper mold, wherein UV light is irradiated from below the lower mold, the UV light transmitted through the lower and upper molds being reflected by the reflection plate to be condensed on the UV curable resin in the re-coating groove of the upper and lower molds. In this coating forming device, only a part of the UV light is transmitted through the lower mold to reach the upper mold, so that the quantity of reflection light is rather small, which means a substantial improvement in terms of the UV light utilization efficiency can not be expected. Further, the upper surface of the upper mold is covered by the reflection plate arranged above the upper mold, and the visual field for inspecting the interior of the coating forming device is closed, making it impossible to check the way the optical fiber is placed in the coating forming device and the way the mold is filled with UV curable resin. Further, since the reflection surface of the reflection plate is concave, it becomes larger in thickness than a reflection plate with a flat reflection surface, resulting in an increase in the size of the reflection plate, which causes difficulty in reducing the size of the coating forming device.

DISCLOSURE OF THE INVENTION

An optical fiber coating mold according to the present invention is comprised of upper and lower molds having joint surfaces, molding grooves being formed in the joint surfaces of the upper and lower molds, a molding portion where a coating formation portion of an optical fiber can be arranged and a supply passage for supplying UV curable resin being formed between the opposing molding grooves of the upper and lower molds when the joint surfaces of the upper and lower molds are superimposed one upon the other, the molding portion being filled with UV curable resin through the supply passage after arranging the coating formation portion of the optical fiber in the molding portion, the coating formation portion of the optical fiber being coated with the UV curable resin when the UV curable resin is cured by applying light thereto from outside, wherein a shading plate is arranged in the periphery of the molding portion. According to an optical fiber coating mold of the present invention, in the optical fiber coating mold, a shading plate for preventing light irradiated from outside from entering the supply passage may be arranged on the outer side of the supply passage.

In an optical fiber coating forming device according to the present invention, a coating formation portion of an optical fiber is set in a molding portion of a mold set in a case, the outer periphery of the coating formation portion of the optical fiber in the molding portion being filled with UV curable resin, the outer periphery of the coating formation portion of the optical fiber being coated with the UV curable resin when the resin is cured by irradiating UV light thereto, the mold consists of a mold described in claim 1 or 2, and the casing contains a container for containing UV curable resin, a supplying device for supplying the UV curable resin in the container to the interior of the molding portion of the mold, a light source for generating UV light to be irradiated to the mold, and a control unit for controlling the supplying device and the light source.

In the optical fiber coating forming device of the present invention, a mirror or a lens for reflecting UV light to UV curable resin is provided in a casing, and the mirror or the lens is provided so as to secure the requisite visual field for an observation window for observing the interior of the casing. Further, it is also possible to provide a flat reflection plate behind the mold, to arrange a mirror or a lens on the back or side surface of the light source, or to make both or one of the mirror and the lens movable. Further, it is also possible to provide a shading plate for preventing UV light from being irradiated to the UV curable resin in the portions other than the molding portion.

BRIEF DESCRIPTION OF THE DRAWINGS

FIG. 1 is a perspective view showing a mold according to an embodiment mode of the present invention.

FIG. 7 is a perspective view showing an optical fiber coating forming device according to the present invention with its cover closed.

BEST MODE FOR CARRYING OUT THE INVENTION (Embodiment Mode 1)

A mold of the present invention is used to cover a coating formation portion of an optical fiber with UV curable resin. An embodiment mode thereof will now be described.

As shown in FIG. 1, the mold of the present invention is composed of an upper mold 1 and a lower mold 2 which are connected so as to allow opening and closing. There is no particular restriction regarding the material of the upper and lower molds 1 and 2 as long as it transmits UV light. Examples of the material include transparent quartz glass and plastic.

Figure 2A:
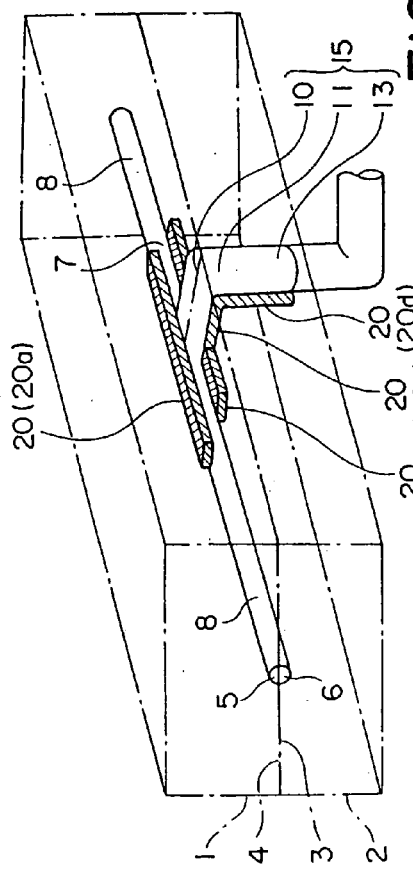
FIG. 2A is a perspective view showing a state in which the upper and lower molds shown in FIG. 1 are joined together.
Figure 2C:
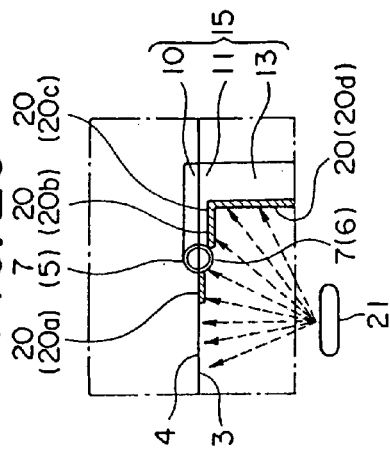
FIG. 2C is a cross-sectional view showing a state in which the upper and lower molds shown in FIG. 1 are joined together.
Figure 2B:
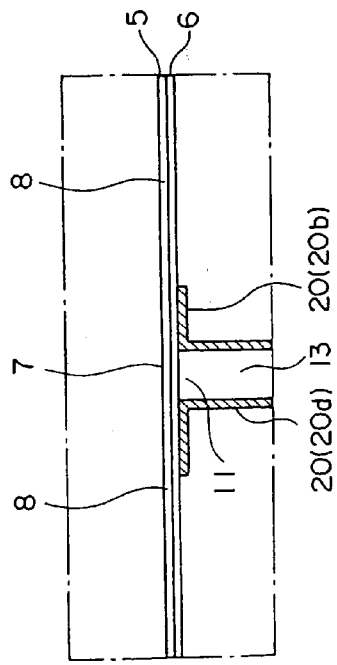
FIG. 2B is a longitudinal sectional view showing a state in which the upper and lower molds shown in FIG. 1 are joined together.

In joint surfaces 3 and 4 of the upper and lower molds 1 and 2, there are formed semi-cylindrical molding grooves 5 and 6 extending full length in the longitudinal direction. The molding grooves 5 and 6 are formed as semi-cylinders whose diameters are slightly larger than the outer diameter of the coating formation portion of the optical fiber. When, as shown in FIG. 2A, the upper mold 1 is put on the lower mold 2 to superimpose their joint surfaces 3 and 4 one upon the other, the two molding grooves 5 and 6 are opposed to each other to define a cylindrical molding portion 7 as shown in FIGS. 2A through 2C, and a retaining portion 8 is formed on either outer side so as to extend continuously in the longitudinal direction. The molding portion 7 accommodates the coating formation portion of the optical fiber, and the retaining portions 8 accommodate the coated portions of the optical fiber on the both outer sides of the coating formation portion. The inner diameter of the molding portion 7 is somewhat larger than the outer diameter of the coating formation portion of the optical fiber arranged therein. High precision mirror finishing is performed on the joint surfaces 3 and 4 of the upper and lower molds 1 and 2 to restrain generation of surface irregularities, thus enabling the joint surfaces to be brought into close contact with each other.

As shown in FIG. 1, in the joint surfaces 3 and 4 of the upper and lower molds 1 and 2, there are formed lateral grooves 10 and 11 perpendicular to the molding grooves 5 and 6. As shown in FIGS. 2B and 2C, the lower mold 2 has a vertical hole 13 one end of which communicates with the lateral groove 11 and the other end of which leads to the exterior. Due to the formation of the lateral groove 11 and the vertical hole 13, when the joint surfaces 3 and 4 of the upper and lower molds 1 and 2 are superimposed one upon the other as shown in FIG. 2A, the lateral grooves 10 and 11 of the molds 1 and 2 are opposed to each other to define a supply passage 15 as shown in 2C; when UV curable resin is supplied to the supply passage 15 from outside, the UV curable resin is supplied into the molding portion 7.

As shown in FIGS. 2A through 2C, a shading plate 20 is embedded in the lower mold 2 so that UV light irradiated to the mold from below the lower mold 2 can be intercepted. The shading plate 20 is composed of thin and narrow shading plates 20a and 20b embedded so as to extend in the longitudinal direction of the molding groove 6 on either side of the central portion with respect to the longitudinal direction of the molding groove 6 (the portion that is at least opposed to the molding groove 5 of the upper mold 1 to define the molding portion 7), and shading plates 20c and 20d arranged at the bottom of the lateral groove 11 and on a side of the vertical hole 13 so that no UV light may enter the lateral groove 11 and the vertical hole 13. The shading plates 20b, 20c, and 20d are formed into a T-shaped integral unit. The shading plates 20a through 20d are appropriately formed of a material which reflects or absorbs UV light or prepared by forming an UV reflection film (e.g., dielectric multi-layer film) on a surface of abase material.

The coating formation portion of an optical fiber is coated as follows by using the mold constructed as described above. In this case, the coating formation portion of the optical fiber consists of two optical fibers abutting and fusion-splice to each other (fusion-splice portion).

(1) The upper mold 1 of the mold is opened and the optical fibers united through fusion connection are arranged in the molding groove 6 of the lower mold 2. At this time, the coating formation portion is positioned at the longitudinal center of the molding groove 6 or in the vicinity thereof.

(2) The upper mold 1 is put on the lower mold 2 to superimpose the joint surfaces 3 and 4 one upon the other. As a result, the molding grooves 5 and 6 are opposed to each other to define in a line the cylindrical molding portion 7 and the retaining portions 8; in the molding portion 7, the coating formation portion of the optical fiber is arranged, and, in the retaining portions 8, the coated portions of the optical fibers on either side of the coating formation portion are arranged. The inner diameter of the molding portion 7 is somewhat larger than the outer diameter of the coating formation portion of the optical fiber, of which coating is peeled off, so that a space (molding space) is defined between the outer peripheral surface of the coating formation portion and the inner peripheral surface of the molding portion 7.

(3) A predetermined amount of UV curable resin is supplied to the interior of the molding portion 7 through the supply passage 15 to fill the molding space with UV curable resin.

(4) As shown in FIG. 2C, light is emitted from a light source 21 previously arranged below the lower mold, and UV light is irradiated to the mold from below. The UV light irradiated is transmitted through the lower mold 2 and is irradiated to the UV curable resin filling the molding space, whereby the UV curable-resin cures, and firmly adheres to the outer peripheral surface of the coating formation portion of the optical fiber. In this case, the shading plates 20a through 20d are embedded in the lower mold 2, so that if some of the UV curable resin supplied to the molding portion 7 extrudes to the exterior of molding portion 7 (i.e., between the joint surfaces 3 and 4 of the upper and lower molds 1 and 2 superimposed one upon the other) or remains in the supply passage 15, no UV light is irradiated to such UV curable resin to cause it to cure.

(5) When the UV curable resin has sufficiently cured, the upper mold 1 is opened, and the optical fiber is released.

By the above-described operations (1) through (5), the coating formation portion of the optical fiber is coated. Here, the inner diameter of the molding portion 7 is the same as or substantially the same as the outer diameter of the optical fiber coated portions retained in the retaining portions 8. Thus, the outer diameter of the coating formation portion that has been coated is the same or substantially the same as the outer diameter of the optical fiber coating.

(Embodiment Mode 2)

Figure 3:
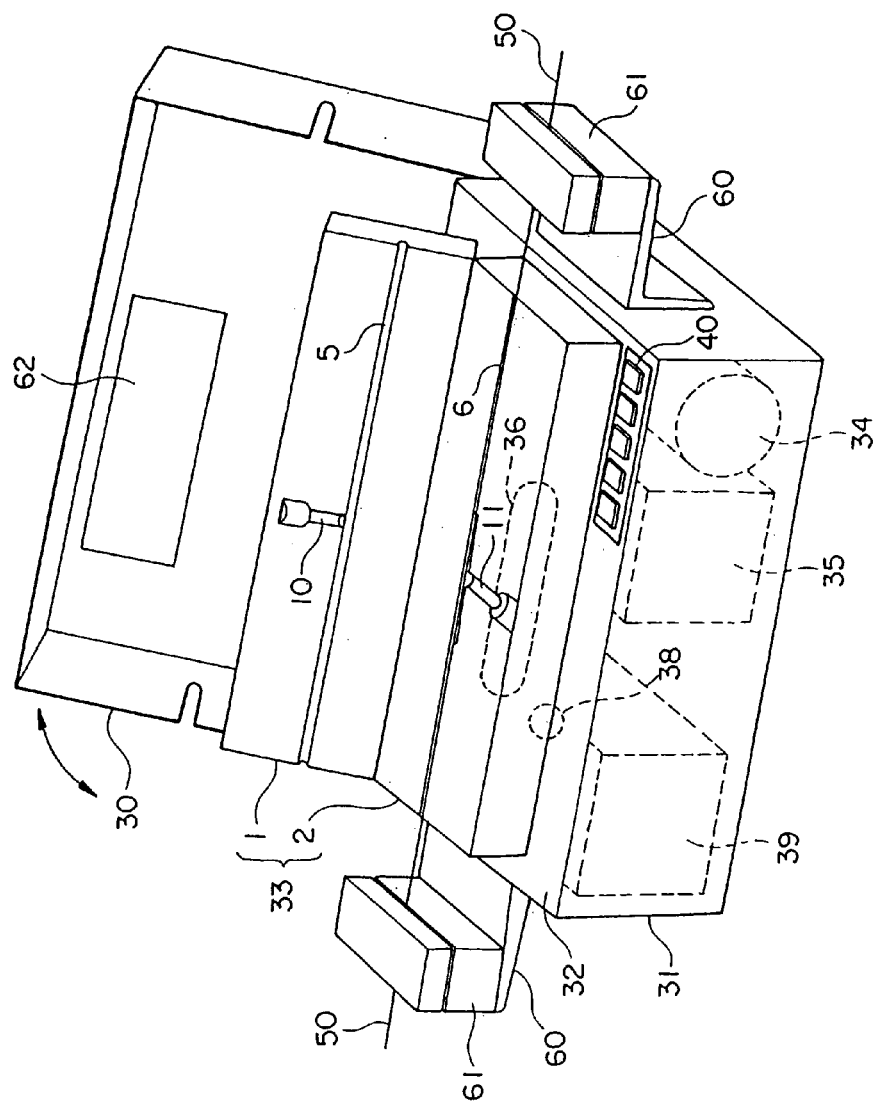
FIG. 3 is a perspective view of an optical fiber coating forming device according to an embodiment mode of the present invention.

Another embodiment mode of the optical fiber coating forming device of the present invention will be described. As shown in FIG. 3, in this coating forming device, a mold 33 according to Embodiment Mode 1 of the present invention is arranged on an upper surface 32 of a case 31 to which a cover 30 is mounted so as to allow opening and closing. The cover 30 and the case 31 are formed of a shading material, so that when the cover 30 is closed, the mold 33 is covered and shaded.

Contained in the case 31 are a container (tank) 34 containing UV curable resin, a supplying device (pump) 35 for supplying the UV curable resin in the tank 34 to the molding portion 7 (FIG. 2A), a light source (UV light source) for generating UV light to be irradiated to the mold 33, a high voltage power source 37 (FIG. 4) for supplying power to the UV light source 36, a photo sensor (UV sensor) 38 for detecting the quantity of UV light transmitted through the mold 33, and a control unit 39 for controlling these components.

UV curable resin sent out from the pump 35 is supplied through a supply pipe (not shown) to the supply passage 15 (FIG. 2A) of the mold 33, and is supplied from the supply passage 15 to the molding portion 7 (FIG. 2A).

Figure 5:
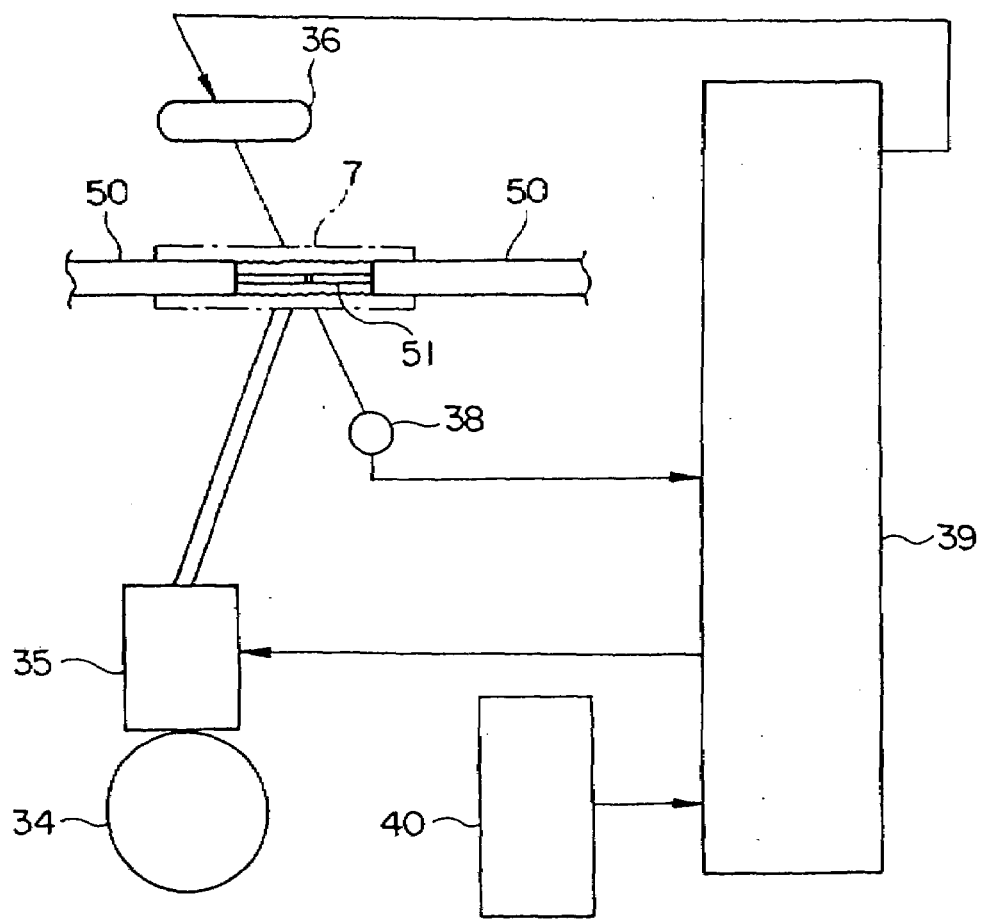
FIG. 5 is an explanatory drawing showing a control system of the optical fiber coating forming device shown in FIG. 3.

The control unit 39 controls the pump 35 and the UV light source 36 as shown in FIG. 5 in accordance with a command output from an operating panel 40 provided on the upper surface 32 of the case 31. The control is effected as follows:

(1) When a predetermined button of the operating panel 40 shown in FIG. 3 is operated, a command is output to the pump 35 to operate the pump 35, and, as shown in FIG. 5, the UV curable resin in the tank 34 is supplied to the interior of the molding portion 7 of the mold 33 where a coating formation portion 51 of an optical fiber 50 is arranged.

(2) When a predetermined amount of UV curable resin has been supplied to the mold space of the molding portion 7, a predetermined button on the operating panel 40 is operated to output a command to the pump 35 to stop the pump 35, and a command is output to the UV light source 36 to cause the UV light source 36 to emit light, irradiating UV light to the mold 33 as shown in FIG. 2C. Here, as shown in FIGS. 2A through 2C, the shading plate 20 is embedded in the mold 33, so that the UV light irradiated to the mold 33 is thereby shaded, and no UV light is applied to any UV curable resin extruding to the exterior of the molding portion 7 (i.e., between the joint surfaces 3 and 4 of the upper and lower molds 1 and 2 superimposed one upon the other) or to the UV curable resin remaining in the supply passage 15 (FIG. 2A) to cure such UV curable resin.

(3) When a predetermined period of time has elapsed, a predetermined button on the operating panel 40 is operated to output a command to the UV light source 36, causing the UV light source 36 to stop light emission.

The control unit 39 shown in FIG. 5 compares the quantity of UV light detected by a photo sensor 38 (detected value) with a set value; when the detected value is less than the set value, a command is output to a high-voltage power source 37 (FIG. 4) so as to increase the power supply. Conversely, when the detected value is more than the set value, a command is output to the high-voltage power source 37 so as to reduce the power supply. Due to this control, the quantity of UV light irradiated to the mold 33 is maintained at a fixed level.

Figure 4:
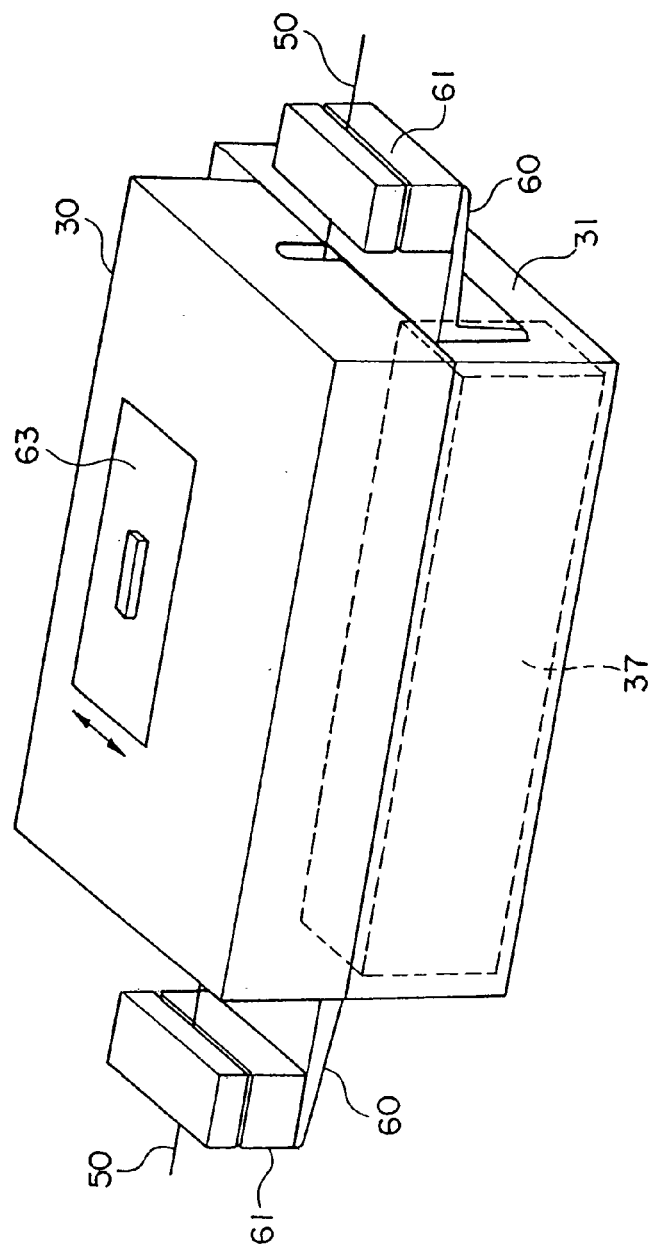
FIG. 4 is a back side view of the optical fiber coating forming device shown in FIG. 3 with its cover closed.

As shown in FIG. 3, on either longitudinal side surface of the case 31, there protrudes an L-shaped support 60, on which a clamp 61 is arranged. The clamps 61 nip and hold the coated portions of the optical fiber 50 outwardly protruding from the longitudinal side surfaces of the mold 33. The cover 30 has an observation window 62 which, when the cover is closed, makes it possible to observe the molding portion 7 (FIG. 2A) of the mold 33 and its periphery. Further, a shutter 63 (FIG. 3) slidable in the directions of the arrows of FIG. 4 is mounted to the observation window 62. Thus, the observation window 62 is opened for observation of the molding portion 7 and its periphery only when necessary; otherwise, the window 62 is closed so that no external light is irradiated to the molding portion 7 and its periphery.

(Embodiment Mode 3)

While in the mold shown in FIGS. 2A through 2C, the vertical hole 13 is provided in the lower mold 2 to form the supply passage 15, through which UV curable resin can be supplied to the interior of the mold, it is also possible, in the present invention, to cause the lateral grooves 10 and 11 respectively formed in the upper and lower molds 1 and 2 of FIGS. 2A and 2B to open in the side surfaces of the molds 1 and 2; when the lateral groove 10 of the upper mold 1 and the lateral groove 11 of the lower mold 2 are opposed to each other, there is formed a supply passage opening in the side surface of the mold, UV curable resin being supplied into the mold through this supply passage.

The coating formation portion of the optical fiber that can be coated by the mold of the present invention and by the optical fiber coating forming device equipped therewith is not restricted to a fusion-splice portion; for example, it may also be some other portion of an optical fiber from which coating has been removed or an optical fiber core which is not coated.

In the optical fiber coating forming device of the present invention, it is also possible to provide a reflection portion which reflects light transmitted through the mold and causes it to impinge upon the mold. In this case, it is desirable to provide a concave reflection surface in the reflection portion so that the received light may be condensed in the molding portion of the mold.

(Embodiment Mode 4)

Another embodiment mode of the optical fiber coating forming device of the present invention will be described with reference to FIGS. 6 through 11. In the coating forming device of FIG. 6, a case 140 is formed by mounting a cover 74 to a device main body 73 so as to allow opening and closing; when the cover 74 is closed on the device main body 73 as shown in FIG. 7, the case 140 forms a black box.

On either side surface of the device main body 73, there is provided a support 141, upon which a clamp 72 for holding an optical fiber 71 is provided. The clamp 72 is composed of a holder 142 and a presser cover 143 mounted thereto so as to allow opening and closing; after placing the optical fiber 71 on the holder 142 with the presser cover 143 open, the presser cover 143 is closed, whereby the optical fiber 71 is clamped.

Figure 6:
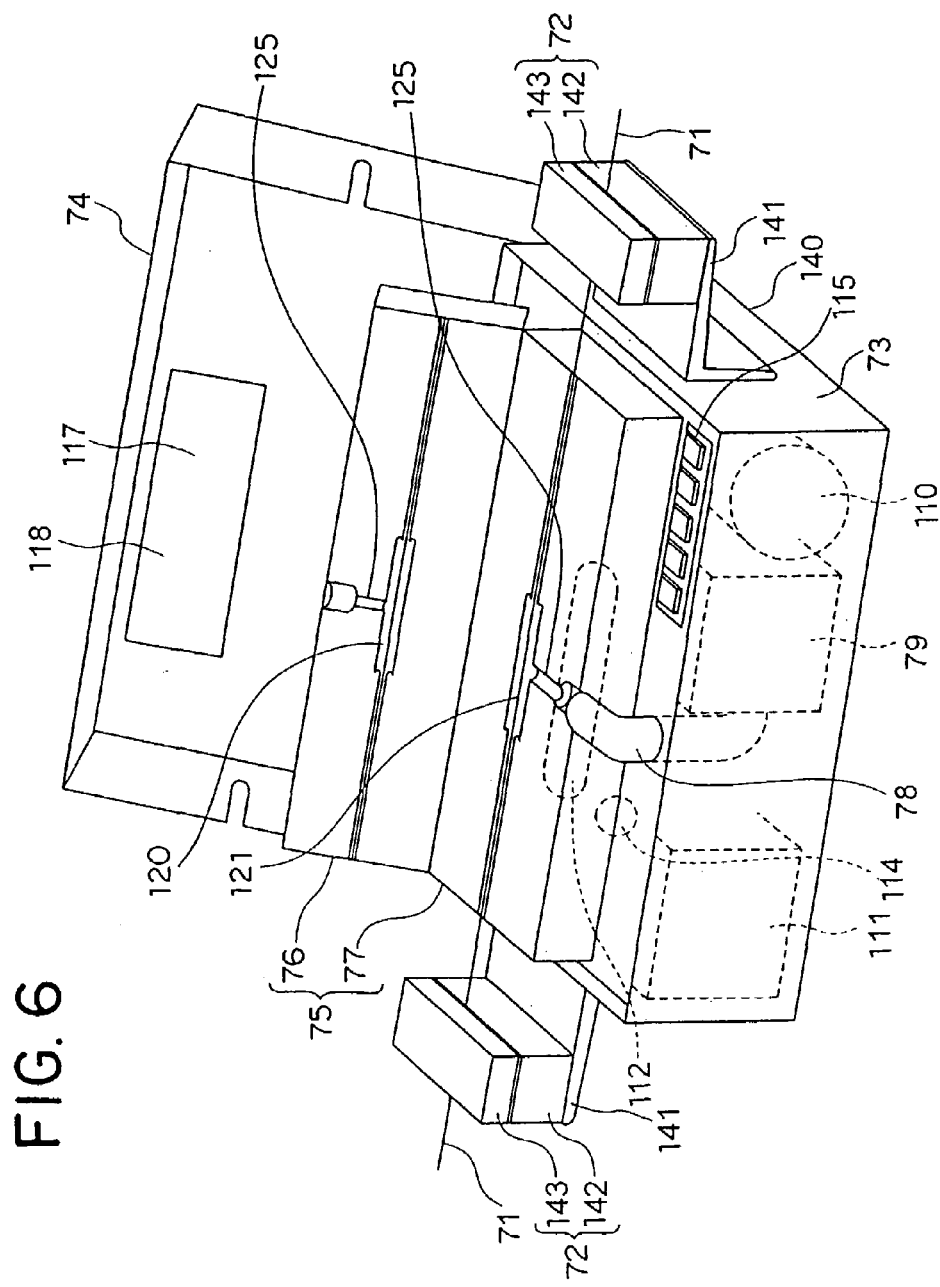
FIG. 6 is a perspective view of an optical fiber coating forming device according to an embodiment mode of the present invention.

As shown in FIG. 6, the device main body 73 is equipped with a mold 75 for shaping UV curable resin filling the outer periphery of the optical fiber 71 into a desired configuration, a tank 110 for storing UV resin, a pump 79 for sending the UV curable resin in the tank 110 to a supply pipe 78, the supply pipe 78 for supplying UV curable resin to the mold 75, a control unit 111 for controlling the control system, and an operating panel 115. The device main body 73 is also equipped with a UV light source 112 shown in FIG. 9, a UV sensor 114 for measuring the quantity of light from the UV light source 112, and a high-voltage power source 116 (not shown)

As shown in FIGS. 6 and 7, an observation window 118 is provided in the cover 74, and a shutter 117 is provided in the observation window so as to allow opening and closing. The shutter 117 may be of a desired structure, such as a door or a sliding door.

As shown in FIG. 1, in the mold 75, the upper mold 76 and the lower mold 77 are connected so as to allow opening and closing; at the center with respect to the longitudinal direction of the upper mold 76, there is formed a semi-cylindrical molding groove 120 that is downwardly open, and, at the center with respect to the longitudinal direction of the lower mold 77, there is formed a semi-cylindrical molding groove 121 that is upwardly open. When the upper mold 76 is put on the lower mold 77 to superimpose their joint surfaces one upon the other, the molding grooves 120 and 121 of the two molds are opposed to each other to define a cylindrical molding portion 113.

Figure 8A:
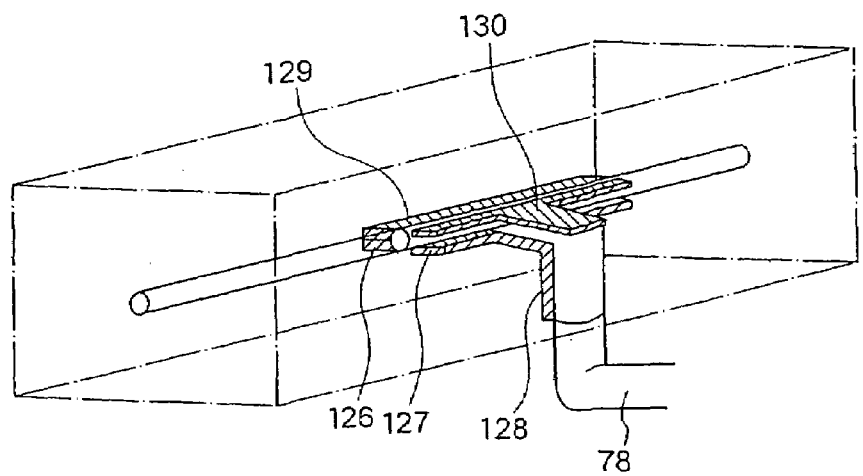
FIG. 8A is a schematic diagram showing an example of the mold of an optical fiber coating forming device according to the present invention.
Figure 8B:
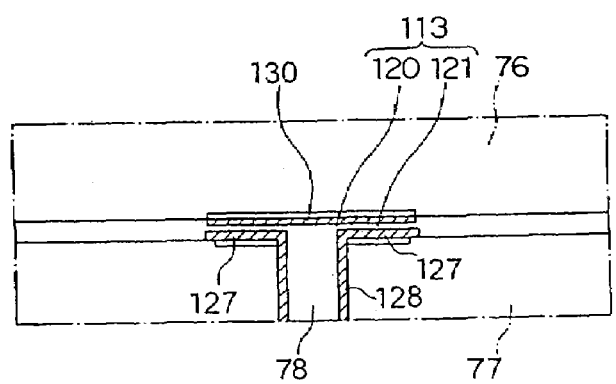
FIG. 8B is a front view of the mold of FIG. 8A.
Figure 8C:
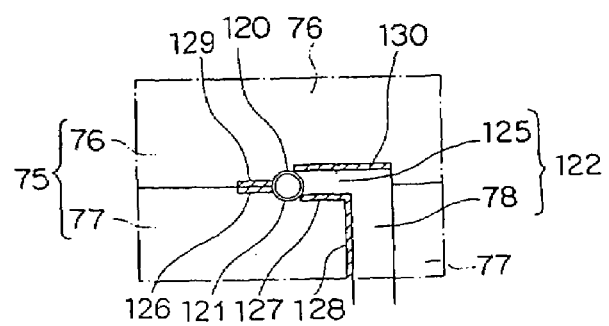
FIG. 8C is a side view of the mold of FIG. 8A.

As shown in FIGS. 8A through 8C, a shading plate 129 is arranged behind the molding groove 120 of the upper mold 76, and this shading plate 129 helps to prevent UV light from being applied to the UV curable resin extruding between the upper and lower molds 76 and 77. In front of the molding groove 120 and on top of a gate 125, there is arranged a shading plate 130 that is T-shaped in plan view, and this shading plate 130 intercepts UV light so that no UV light may be applied to the UV curable resin extruding between the upper and lower molds 76 and 77 and the UV curable resin staying at the gate 125. Further, behind the molding groove 121 of the lower mold 77, there is arranged a shading plate 126, which intercepts UV light so that no UV light may be applied to the UV curable resin extruding between the upper and lower molds 76 and 77. A shading plate 127 is arranged in front of the molding groove 121 and the on the lower surface of the gate 125, and a shading plate 128 is arranged on the outer side of the supply pipe 78; these shading plates 127 and 128 intercept UV light so that no UV light may be applied to the UV curable resin extruding between the upper and lower molds 76 and 77 and the UV curable resin accumulated in the supply passage 122 (the gate 125 and the supply pipe 78). These shading plates prevent UV light from being applied to the UV curable resin, whereby curing of UV curable resin in portions other than the molding grooves 120 and 121 is prevented.

The shading plates 126, 127, 128, 129, and 130 may consist, for example, of metal plates, UV cutoff filters glued to substrates, coating of UV cutoff resin, metal film formed on the mold 75 itself by evaporation, or UV cutoff resin coating formed on the mold.

Figure 9:
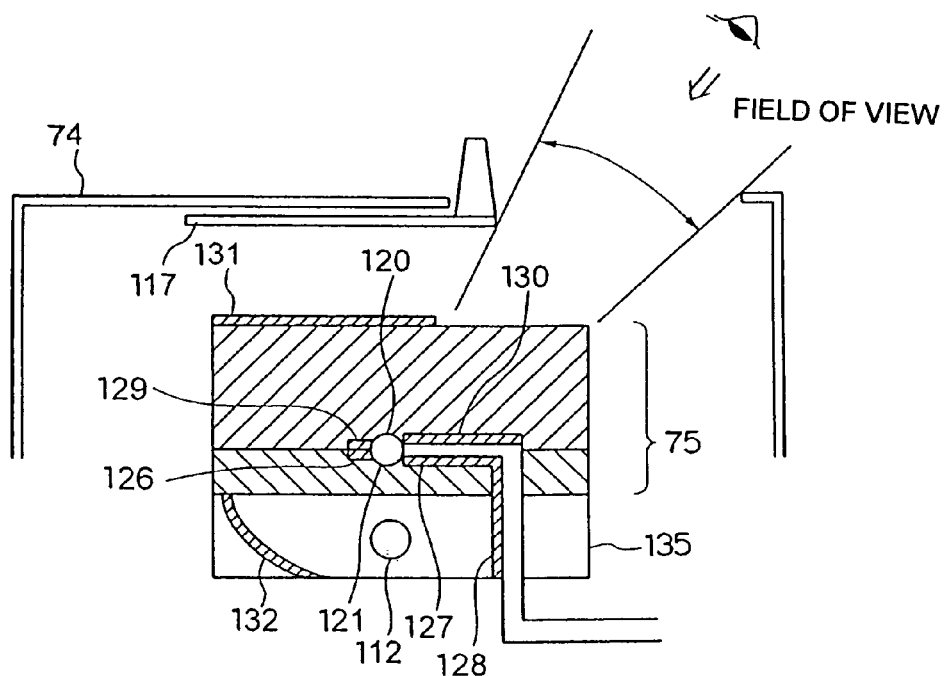
FIG. 9 is a side view, partly in longitudinal section, showing an example of the arrangement of the mold, mirror, and reflection plate in an optical fiber coating forming device according to the present invention.

As shown in FIG. 6, the mold 75 is accommodated in the device main body 73. The supply pipe 78 is connected to the molding groove 121 of the mold 75 through the gate 125, the outlet of the supply pipe 78 being arranged, and UV curable resin being supplied from the supply pipe 78 to the molding groove 121 through the gate 125. As shown in FIG. 9, a mirror 131 is arranged on the back surface of the mold 75, and a lamp unit 135 is arranged on the front surface of the mold 75. The lamp unit 135 contains a UV light source 112, and a mirror 132 is arranged behind it and to the left. The mirror 132 consists of a concave mirror. A concave mirror helps to enhance the condensing efficiency; on the other hand, it involves an increase in thickness, which is disadvantageous from the viewpoint of reduction in size. By arranging the lamp unit 135 and the mirror 132 at positions out of the field of view of the window 118, it is possible to visually check the molding grooves 120 and 121 of the mold 75 through the window 118 of the cover 74.

The procedures for using the optical fiber coating forming device of FIGS. 6 and 7 are as follows. First, the cover 74, the upper mold 76, and the presser covers 143 are opened, and the optical fiber 71 is placed on the holders 142 and in the molding groove 121 of the lower mold 77. Then, the upper mold 76 is closed to hold the optical fiber 71 between the molding groove 120 of the upper mold 76 and the molding groove 121 of the lower mold 77. Further, the presser covers 143 are closed so that the optical fiber 71 is held between the presser covers 143 and the holders 142. Further, the cover 74 is closed to put the casing 140 in a black-box state.

Figure 10:
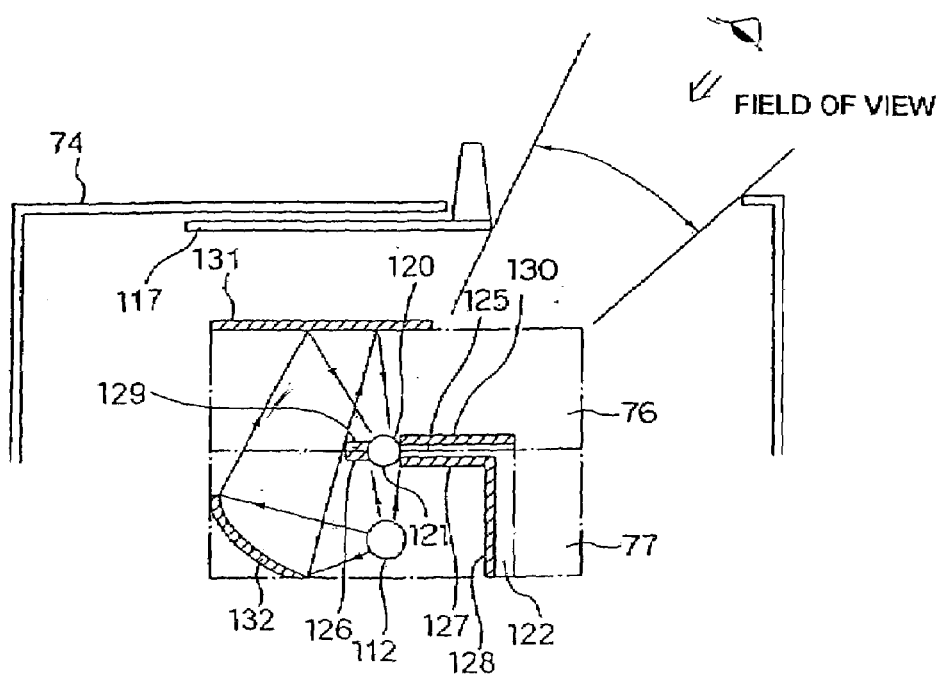
FIG. 10 is an explanatory drawing showing how UV light is irradiated in the optical fiber coating forming device of FIG. 9.

FIG. 10 shows the operation of the optical fiber coating forming device of FIG. 9. In FIG. 10, a portion of UV light emitted from the UV light source 112 directly reaches the molding groove 121 to be irradiated to the UV curable resin filling the molding groove 121, curing this UV curable resin. At this time, the shading plates 126, 127, and 128 prevent UV light from being applied to the UV curable resin extruding between the upper and lower molds 76 and 77 and the UV curable resin accumulated in the supply passage 122 (the gate 125 and the supply pipe 78), whereby curing of the extruding UV curable resin and the accumulated UV curable resin is prevented. The other portion of the UV light emitted from the UV light source is reflected by the mirror 132, converged, and transmitted upwards. The UV light transmitted upwards is reflected by the mirror 131 and is directed toward the molding groove 120 to be irradiated to the UV curable resin filling the molding groove 120, thereby curing the UV curable resin. At this time, the shading plates 129 and 130 prevent UV light from being applied to the UV curable resin extruding between the upper and lower molds 76 and 77 and to the UV curable resin accumulated in the gate 125, preventing curing of the UV curable resin. Further, it is possible to visually observe the molding grooves 120 and 121 through the window 118 of the cover 74 to confirm the curing of the UV curable resin.

Figure 11:
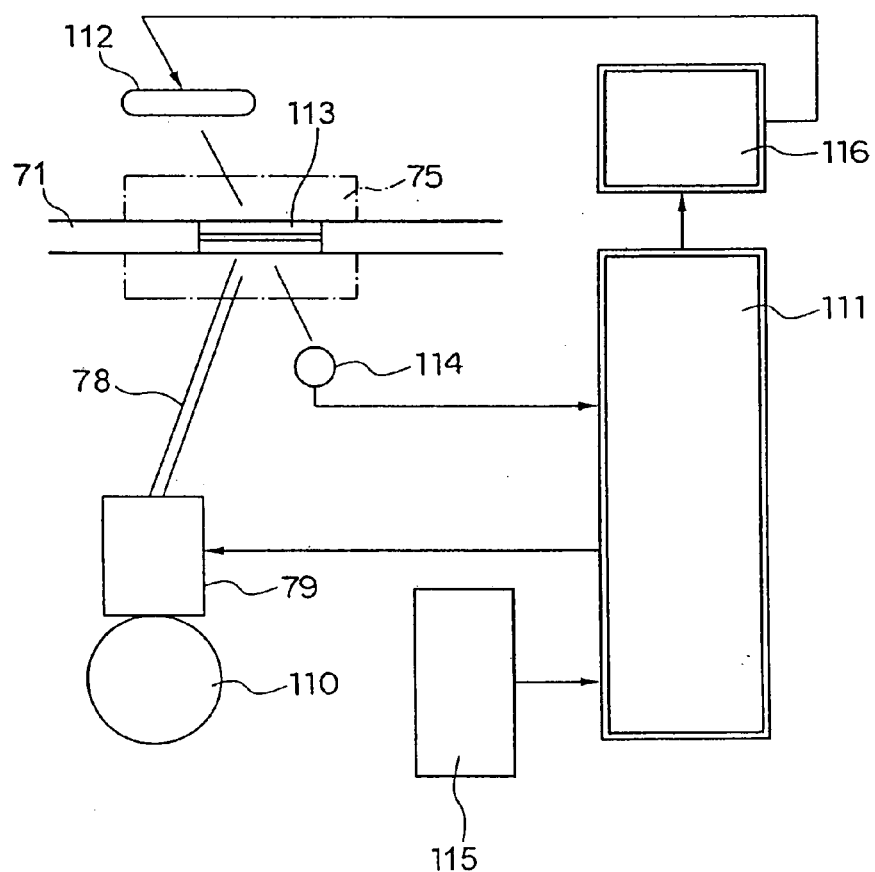
FIG. 11 is a diagram illustrating a control system in an optical fiber coating forming device according to the present invention.

FIG. 11 shows the operation of the control system of the optical fiber coating forming device. The control unit 111 operates the supplying device (pump) 79 in accordance with a command from the operating panel 115 to send the UV curable resin in the tank 110 into the mold 75 through the supply pipe 78. The light emission amount for the UV light source 112 is set on the operating panel 115; when a command for light emission is issued, the UV light source 112 is lit up by high voltage supplied from the high-voltage power source 116 through the control unit 111. The light emitting condition of the UV light source 112 is detected (observed) by a UV sensor 114 and sent to the control unit 111. The control unit 111 compares the set value determined at the operating panel 115 with the detected value from the UV sensor 114 to automatically effect correction to a predetermined value.

(Embodiment Mode 5)

Figure 12:
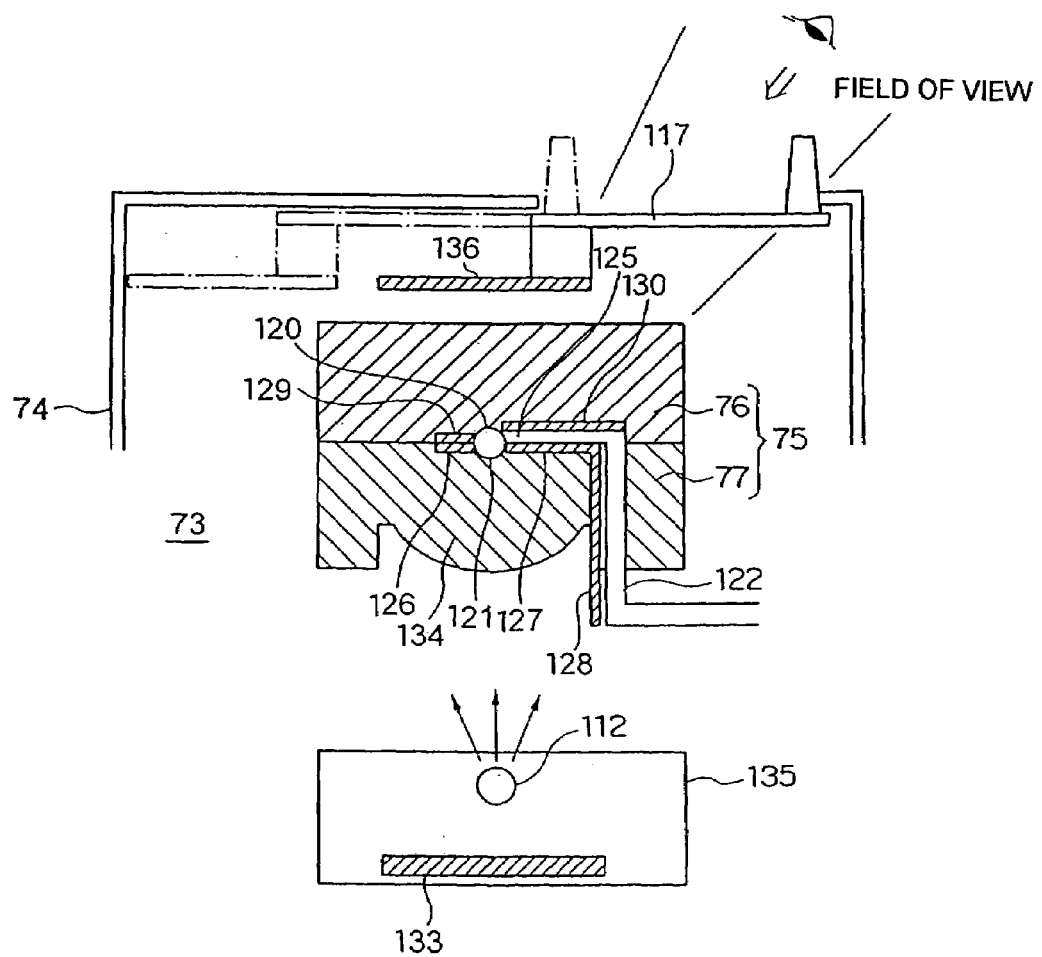
FIG. 12 is a side view, partly in longitudinal section, showing another example of the arrangement of the mold, mirror, and reflection plate in an optical fiber coating forming device according to the present invention.

FIG. 12 shows another embodiment mode of the optical fiber coating forming device of the present invention. In FIG. 12, the mold 75 and the lamp unit 135 are accommodated in the device main body 73. A lens 134 is formed on the lower mold 77 constituting a part of the mold 75. The lamp unit 135 is equipped with the UV light source 112 and the mirror 133 arranged behind it. The lamp unit 135 is arranged below the lens 134.

The cover 74 shown in FIG. 12 has an observation window 118 for observing the molding grooves 120 and 121 of the mold 75; the window is equipped with a shutter (sliding door) 117 that can be opened and closed. A mirror 136 is mounted to the shutter 117; when the shutter 117 is opened, the mirror 136 moves over the back surface of the mold 75 to be placed in the position indicated by the imaginary line in FIG. 12, thereby securing the field of view from the window 118. The lens 134 of FIG. 12 may also be separate from the lower mold 77.

(Embodiment Mode 6)

Figure 13:
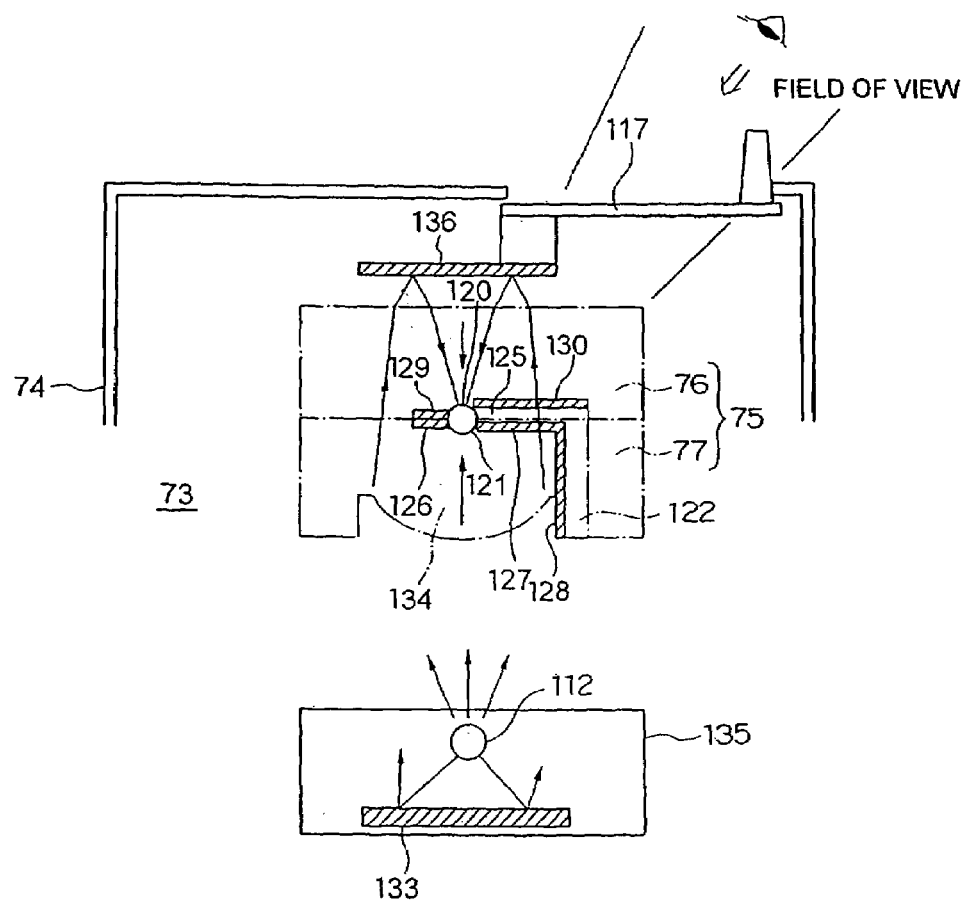
FIG. 13 is an explanatory drawing showing how UV light is irradiated in the optical fiber coating forming device of FIG. 12.

FIG. 13 shows an example of the operation of the optical fiber coating forming device of FIG. 12. A portion of the UV light emitted from the UV light source 112 travels directly upwards, and another portion thereof is reflected by the mirror 133 of the lamp unit 135 and then transmitted upwards. The UV light transmitted upwards is converged by the lens 134 formed on the lower mold 77. A portion of the converged UV light travels directly toward the molding groove 121 and is irradiated to the UV curable resin filling the molding groove 121, thereby curing the UV curable resin. At this time, the shading plates 126, 127, and 128 prevent UV light from being applied to the UV curable resin extruding between the upper and lower molds 76 and 77 and to the UV curable resin accumulated in the supply passage 122 (the gate 125 and the supply pipe 78), thereby preventing curing of the UV curable resin. Another portion of the UV light converged by the lens 134 is reflected by the mirror 136 and travels toward the molding groove 120 and is irradiated to the UV curable resin filling the molding groove 120, thereby curing the UV curable resin. At this time, the shading plates 129 and 130 prevent UV light from being applied to the UV curable resin extruding between the upper and lower molds 76 and 77, thereby preventing curing of the UV curable resin.

INDUSTRIAL APPLICABILITY

One aspect of the optical fiber coating mold of the present application, in which shading plates are arranged around the molding portion to be filled with UV curable resin, provides the following effect.

Even if some of the UV curable resin filling the molding portion extrudes from the molding portion, no light is irradiated to the extruding UV curable resin. Thus, the separation of the upper and lower molds is not hindered by cured UV curable resin, nor does cured resin adhere to the coated portion to generate burr.

Another aspect of the optical fiber coating mold of the present application, in which a shading plate is arranged on the outer side of the supply passage for supplying UV curable resin to the molding portion, provides the following effect.

Even if some UV curable resin remains in the supply passage, no light is applied to the remaining UV curable resin. Thus, the supply passage is not clogged by cured UV curable resin.

One aspect of the optical fiber coating forming device of the present application, which is comprised of a mold providing the above-described effects, provides the same effects as described above. Further, provided in a case are a container for containing UV curable resin, a supplying device for supplying the UV curable resin in the container to the molding portion of the mold, a light source for emitting light to be irradiated to the mold, and a control unit for controlling the supplying device and the light source, so that it is possible to automatically perform with a single optical fiber coating forming device the supply of UV curable resin to the molding portion and control thereof as well as the irradiation of UV light to the UV curable resin and control thereof.

Another aspect of the optical fiber coating forming device of the present invention provides the following effects.

1. Due to the provision of a mirror or a lens for reflecting UV light to UV curable resin, it is possible to efficiently utilize UV light by transmitting UV light converged by the mirror or the lens to the molding groove of the mold, making it possible to cure the UW curable resin efficiently and reliably in a short time.

2. Due to the efficient utilization of UV light, it is possible to achieve power saving, and it is possible to achieve a reduction in the size and weight of the UV lamp lighting system, in particular, the high-voltage power source.

3. Due to the arrangement of the mirror or the lens at positions where the field of view for the observation window is secured, it is easier to check the way the optical fiber is set, the way the mold is filled with UV curable resin, etc.

In still another aspect of the optical fiber coating forming device of the present invention, the reflection plate provided behind the mold is flat, so that the incorporation of the reflection plate into the main body is facilitated and, further, it is possible to achieve a reduction in the size and thickness of the optical fiber coating forming device, thereby achieving an improvement in assembly operability.

In yet still another aspect of the optical fiber coating forming device of the present invention, the mirror or the lens is arranged on the back surface or the side surface, so that the field of view for the observation window for observing the interior is secured, making it possible to coat the coating formation portion of an optical fiber while observing the interior.

In yet still another aspect of the optical fiber coating forming device of the present invention, both or one of the mirror and the lens is movable, so that when irradiating UV light to UV curable resin, the mirror or the lens is moved to a position where it does not interfere with UV light irradiation; when observing the interior, the mirror or the lens is moved to a position where it does not interfere with the observation, so that it is possible to efficiently apply UV light and to easily observe the interior.

In yet still another aspect of the optical fiber coating forming device of the present invention, a shading plate for preventing irradiation of UV light to UV curable resin in places other than the molding groove (places where no irradiation of UV light is needed) is provided in the vicinity of the molding groove of the mold, so that it is possible to prevent curing of UV curable resin in places where no irradiation of UV light is needed.

The invention claimed is:

1. An optical fiber coating mold comprising:
   upper and lower molds having joint surfaces,
   molding grooves being formed in the joint surfaces of the upper and lower molds,
   a molding portion where a coating formation portion of an optical fiber is arranged, and
   a supply passage for supplying UV curable resin being formed between the opposing molding grooves of the upper and lower molds when the joint surfaces of the upper and lower molds are superimposed one upon the other, wherein the molding portion is filled with UV curable resin through the supply passage after arranging the coating formation portion of the optical fiber in the molding portion, and the coating formation portion of the optical fiber is coated with the UV curable resin when the UV curable resin is cured by irradiating light thereto from outside,
   a first shading plate arranged in the periphery of the molding portion, and
   a movable lens provided on the lower mold.

2. The optical fiber coating mold according to claim 1, further comprising a second shading plate configured to prevent light irradiated from outside from entering the supply passage, the second shading plate being arranged on the outer side of the supply passage.

3. An optical fiber coating forming device in which a coating formation portion of an optical fiber is set in a molding portion of a mold set in a case, the outer periphery of the coating formation portion of the optical fiber in the molding portion being filled with UV curable resin, the outer periphery of the coating formation portion of the optical fiber being coated with the UV curable resin when the resin is cured by irradiating UV light thereto, wherein said mold comprises a mold as set forth in claim 1, and said case contains a container configured to contain UV curable resin, a supplying device configured to supply the UV curable resin in the container to the interior of the molding portion of the mold, a light source configured to generate UV light to be irradiated to the mold, and a control unit configured to control the supplying device and the light source.

4. An optical fiber coating forming device comprising:
   a coating formation portion of an optical fiber is set in a molding portion of a mold set in a case, the outer periphery of the coating formation portion in the molding portion being filled with UV curable resin, the outer periphery of the coating formation portion of the optical fiber being coated with the UV curable resin when the resin is cured by irradiating UV light thereto, and
   a mirror or a lens for reflecting UV light to the UV curable resin is provided in the case, the mirror or the lens being movable and provided so as to secure the field of view for an observation window for the interior of the case.

5. An optical fiber coating forming device according to claim 4, further comprising a flat reflection plate provided behind the mold.

6. An optical fiber coating forming device according to claim 4, wherein the mirror or the lens is arranged behind or at a side of a light source.

7. The optical fiber coating forming device according to claim 4, further comprising a shading plate configured to prevent irradiation of UV light to the UV curable resin in a place other than the molding portion, the shading plate being provided in the vicinity of the molding portion of the mold.

8. The optical fiber coating forming device according to claim 4, further comprising a shading plate configured to prevent irradiation of UV light to the UV curable resin in a place other than the molding portion, the shading plate being provided in the vicinity of the molding portion of the mold.

* * * * *